(No Model.)
E. SCHMITZ & R. F. PAULSEN.
ATTACHMENT FOR SCREW CUTTING LATHES.
No. 431,625. Patented July 8, 1890.
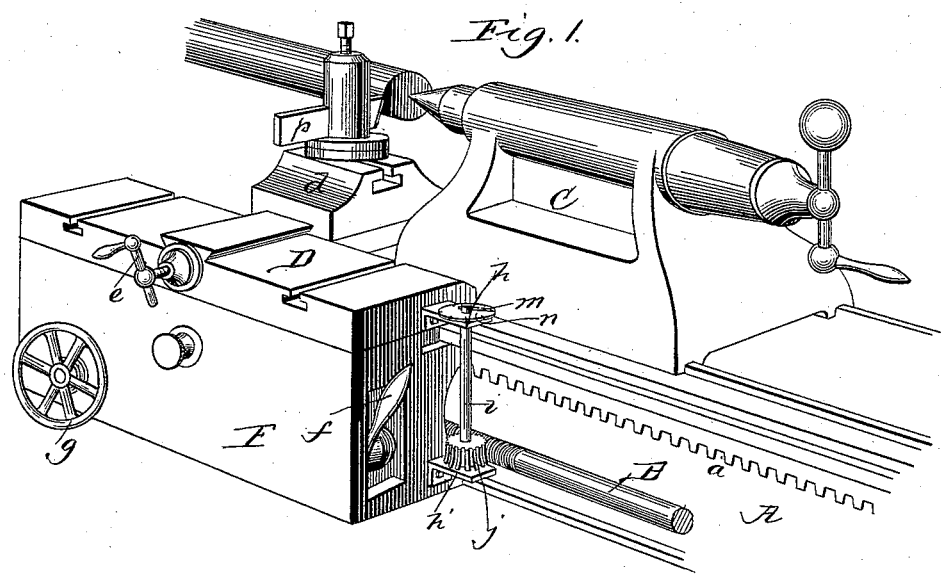
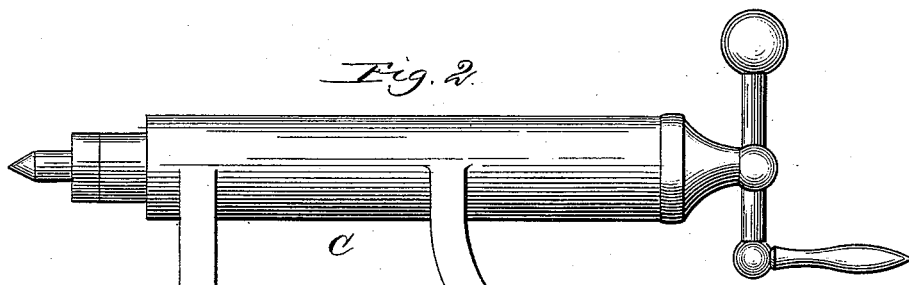
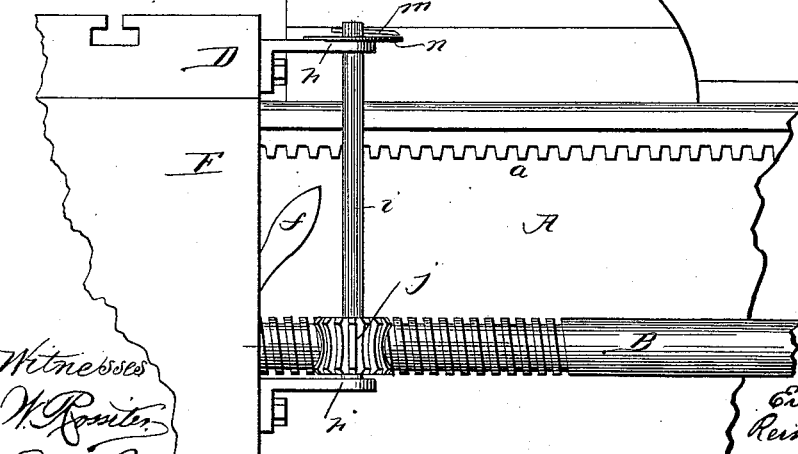
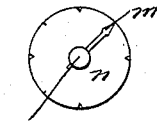

UNITED STATES PATENT OFFICE.

ERNST SCHMITZ AND REINHOLD F. PAULSÉN, OF CHICAGO, ILLINOIS.

ATTACHMENT FOR SCREW-CUTTING LATHES.

SPECIFICATION forming part of Letters Patent No. 431,625, dated July 8, 1890.

Application filed November 1, 1889. Serial No. 328,961. (No model.)

*To all whom it may concern:*

Be it known that we, ERNST SCHMITZ, a citizen of the United States of America, and REINHOLD F. PAULSÉN, a subject of the King of Sweden, both residing at Chicago, in the county of Cook and State of Illinois, have invented certain new and useful Improvements in Attachments for Screw-Cutting Lathes, of which the following is a specification, reference being had therein to the accompanying drawings.

This invention relates to that class of lathes arranged for cutting screws, and in which for that purpose the tool-holder carriage can be coupled and uncoupled with a lead-screw for an automatic feed in the direction toward the head-stock by the two halves of a nut operated by a lever for enveloping the lead-screw or for releasing it, and in which the tool-holder carriage after being released from the lead-screw is moved back again toward the tail-stock by turning a hand-wheel for operating a gear-wheel engaging a rack secured to the shears of the lathes. For cutting a screw-thread upon a cylindrical piece of metal secured in such lathe and continuously rotated therein a train of change-wheels will transmit motion from the spindle of the lathe to the lead-screw the proportional speed for the desired pitch of the thread to be cut, when the operator will adjust the pointed tool to cut a small chip, and then coupling the nut with the lead-screw for the carriage to travel the distance the length the screw-thread is to be, where simultaneously with drawing the tool back sufficiently for clearing the metal to be cut the operator will uncouple the nut from the lead-screw, and will then return the tool-holder to its first starting-point by turning the hand-wheel operating the gear-wheel that engages the rack, and then for starting the second and deeper cut the operator had to stop the lathe, then carefully adjust his tool to be in proper position, and next engage the lead-screw before starting the lathe again, and so on until a thread was completed, and with thus having to stop the lathe for every new cut a great deal of time was wasted.

The object of our invention, therefore, is to provide an attachment for the tool-holder carriage of a screw-cutting lathe that will plainly indicate to the operator the proper moment to couple with the lead-screw for starting the tool again on the proper point without stopping the lathe; and with this object in view our invention consists of the novel devices and combinations of devices, hereinafter described and specifically claimed.

Screw-cutting lathes of the class described being in general use and ready in the market, we have shown on the drawings only such parts thereof that come into direct connection with our attachment, on which drawings—

Figure 1 represents a perspective view of part of the lathe, showing a portion of the shears, the tail-stock, and tool-holder carriage all in position for cutting a thread into a bar of iron and having our attachment. Fig. 2 is an elevation principally showing our attachment to the tool-holder carriage, and Fig. 3 is an plan view of the indicator-point and dial of the attachment.

Corresponding letters of reference in the several figures of the drawings designate like parts.

A denotes the shears having slideways on their upper faces for the head and tail stock and for the carriage to ride upon and having rigid rack-bar $a$ and the lead-screw B longitudinally journaled to one side thereof.

C is the tail-stock, and D the carriage, with the dovetailed guide for tool-holder $d$ transversely shifted by a screw operated by a crank $e$. This carriage D has bolted under its sideward overhanging end a box F, that is interiorly provided with the two half-nuts for engaging or releasing the lead-screw B, being operated by lever $f$, and has also interiorly pivoted the usual gear-wheels for engaging rack $a$, operated by hand-wheel $g$, all of the above being of any usual and well-known construction.

Against one end of carriage-box F we secure two brackets $h$ $h'$, providing journal-boxes for an upright shaft $i$, upon the lower part of which is mounted a worm-wheel $j$, engaging the threads of lead-screw B, and to the upper extremity of which shaft $i$ is secured an indicator-point $m$, rotating over a dial-plate $n$, secured upon the upper bracket $h$. This dial-plate $n$ being divided on its periphery by marks into eight (more or less) equal parts, after moving the carriage D backward to its starting-point for the screw-thread to be cut, and then after adjusting the tool $p$ transversely for the desired depth of cut for the following operation, the wheel $j$ being rotated by the rotation of the lead-screw B and the indicator-point $m$ rotating therewith, such point $m$ when coming in line with one or the other dial-mark for the particular pitch of the screw to be cut will indicate the moment for depressing the lever $f$, enabling thereby instantly to engage the nut-halves with the lead-screw B, with the tool $p$ in the exact position, when now the tool-holder carriage D will be moved by such lead-screw, and while thus moving the shaft $i$ with wheel $j$ and indicator-point $m$, moving with the carriage, will stop rotating.

The number of teeth of worm-wheel $j$ will have to be corresponding with the pitch of the lead-screw to have the dividing-marks on dial-plate $n$ equally spaced, and at the same time suitable for all the different pitches of screw-threads to be cut—say from two threads to the inch to forty threads to the inch—to which the lead-screw may be speeded proportional to the speed of the lathe-spindle by the change-wheels.

This attachment, as will be readily seen, will enable the operator to couple the carriage to the lead-screw at the proper point instantly and without fail after adjusting the tool $p$ transversely and without having to stop and start the lathe with each cut, thus enabling him to cut screw-threads much quicker and with less wearisome and close attention than without such attachment. It will also be seen that this very simple device can be readily attached to the carriage of any screw-cutting lathe.

Although we have shown and described the shaft $i$ to be vertical and to be pivoted in brackets $h\ h'$, secured against the end of the carriage-box, this shaft may as well be arranged to be on a horizontal position, and it may be pivoted in proper journal-boxes formed in or to the carriage, and therefore we desire not to be restricted to the particular arrangement specified.

What we claim is—

1. The combination, with a screw-cutting lathe of the class described and with the tool-holder carriage and lead-screw thereof, of shaft $i$, having mounted worm-wheel $j$ and indicator-point $m$, and being pivotally attached to the tool-holding carriage with its wheel $j$ engaging the lead-screw, and a rigid dial to be used with such indicator-point, all substantially as set forth.

2. The combination, with a screw-cutting lathe of the class described and with the tool-holder carriage and lead-screw thereof, of upright shaft $i$, having mounted worm-wheel $j$, engaging the lead-screw, the indicator-point $m$, secured to the upper extremity of said shaft, the latter being journaled in brackets $h\ h'$, secured against the end of the tool-holder carriage, and dial-plate $n$, rigidly secured upon bracket $h$, all substantially as set forth.

In testimony whereof we affix our signatures in presence of two witnesses.

ERNST SCHMITZ.
REINHOLD F. PAULSÉN.

Witnesses:
WILLIAM H. LOTZ,
OTTO LUEBKERT.